Aug. 19, 1958     E. S. GANDRUD     2,848,143
SPREADER FOR GRANULAR MATERIAL AND FEEDING ROTOR THEREFOR
Filed March 1, 1956
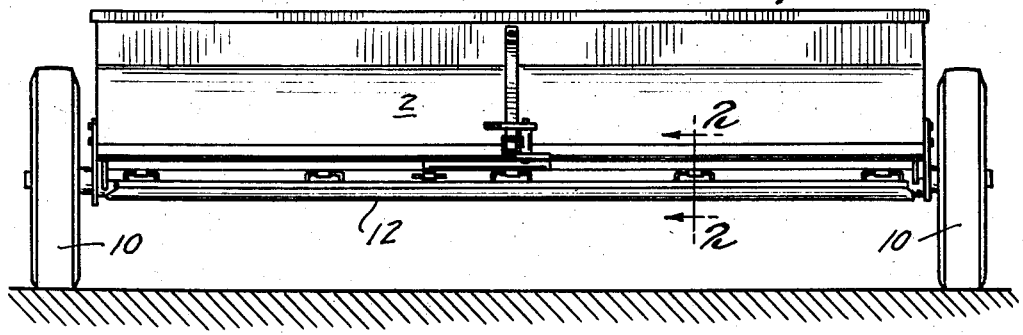
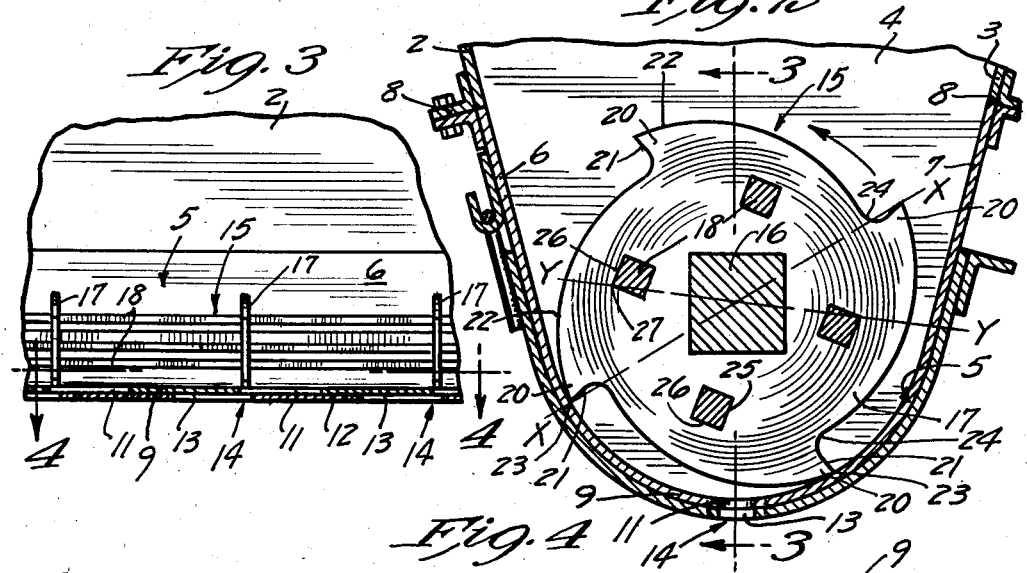
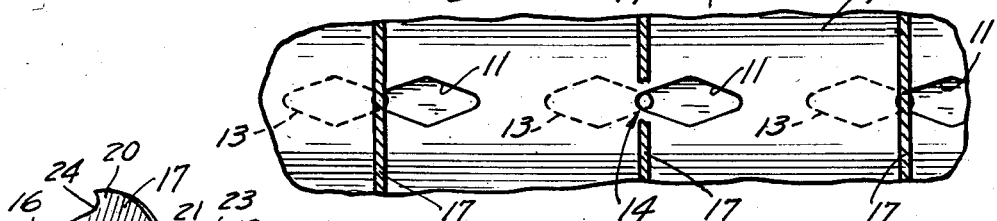
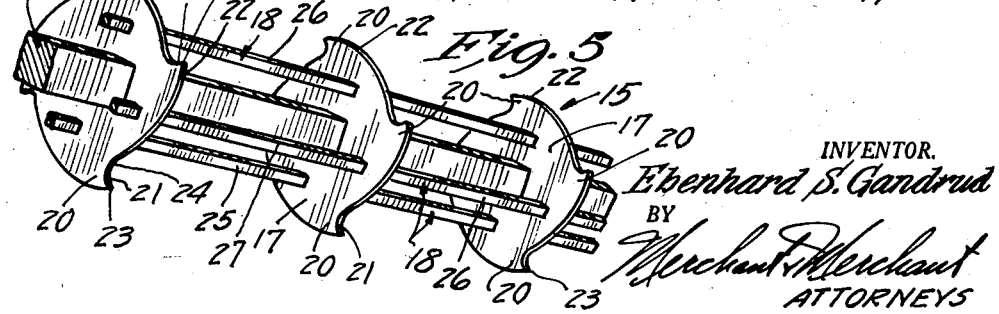
INVENTOR.
*Eberhard S. Gandrud*
BY
*Merchant & Merchant*
ATTORNEYS United States Patent Office 2,848,143
Patented Aug. 19, 1958

2,848,143

SPREADER FOR GRANULAR MATERIAL AND FEEDING ROTOR THEREFOR

Eberhard S. Gandrud, Owatonna, Minn.

Application March 1, 1956, Serial No. 568,748

5 Claims. (Cl. 222—242)

My present invention relates to machines for distributing granular material such as fertilizer, seeds and the like over a field and more particularly to improvements in fertilizer spreader construction of the type disclosed in my United States Letters Patents Nos. 2,350,107 and 2,630,945.

Present-day commercial fertilizers in granular form are usually shipped in bags or like containers to the user and, during transportation and storage, the granular material often cakes into relatively large lumps which must be broken up before spreading to insure an accurate and uniform distribution thereof. Although the outer surfaces of each grannule of such material are usually dry, the interiors thereof contain sufficient moisture to render the same very sticky when individual granules are fractured or cut. For this reason, difficulty has been experienced in employing spreaders having agitators or feeding rotors utilizing elongated feeding bars that pass over the bottoms of the discharge port equipped feeding hoppers of these spreaders in very close proximity thereto. These feeding bars often break up individual granules so that the granules adhere to the inner surface of the hopper bottom and build up to a sticky mass which interferes with proper feeding and often causes the feeding rotor to bind and the hopper bottom to be warped out of shape by the feeding bar, and sometimes damaged to a degree that replacement thereof is necessary. This is particularly true when the granular material is being dispensed at a relatively slow rate through relatively small discharge apertures in the bottom of the feeding hopper.

An important object of my invention is the provision of a fertilizer spreader including a mobile hopper having a plurality of longitudinally spaced discharge ports in the cross sectionally arcuate bottom thereof, and an elongated feeding rotor journaled in the hopper in coaxial relation to the arcuate bottom wall, said feeding rotor comprising disc-like feeding elements each overlying a different one of the discharge ports and working in close relation thereto, and an elongated feeding bar connecting said discs intermediate their outer edges and the central portions thereof, whereby the feeding bar and disc-like elements cooperate to break up lumps of granular material, feed the same toward the discharge ports and prevent choking of the discharge ports by said granular material.

Another object of my invention is the provision of a spreader of the type set forth including a cross sectionally arcuate hopper bottom having longitudinally spaced discharge ports and a cooperating cross sectionally arcuate gate plate having similar discharge ports cooperating with the hopper bottom ports to provide discharge passages that are variable in size, wherein the disc-like feeding elements of the feeding rotor overlie the portions of the hopper bottom discharge ports which cooperate with the gate plate discharge ports to define minimum area discharge passages, to feed material therethrough.

Another object of my invention is the provision of a feeding rotor which will effectively break up large lumps of granular material and feed the same to the discharge passages with a minimum of individual granule fracture.

Another object of my invention is the provision of an elongated feeding rotor structure which is relatively light in weight, which is highly resistant to binding and twisting, and which is extremely durable in use.

The above and still further highly important objects and advantages of my invention will become apparent from the following detailed specification, appended claims and attached drawings.

Referring to the drawings, which illustrate the invention and in which like reference characters indicate like parts throughout the several views:

Fig. 1 is a view in front elevation of a fertilizer spreader incorporating my invention, some parts being removed and some parts shown in section;

Fig. 2 is an enlarged fragmentary section taken substantially on the line 2—2 of Fig. 1;

Fig. 3 is a fragmentary view partly in elevation and partly in section taken substantially on the line 3—3 of Fig. 2;

Fig. 4 is a fragmentary view partly in top plan and partly in section taken substantially on the line 4—4 of Fig. 3; and Fig. 5 is a fragmentary view in perspective of the feeding rotor of my invention.

Referring with greater detail to the drawings, a fertilizer spreader is shown as comprising a hopper 1 having front and rear walls 2 and 3 respectively, end walls 4, one of which is shown, a hopper bottom 5 having upwardly diverging front and rear side wall portions 6 and 7 respectively that are rigidly secured to the front and rear walls 2 and 3 respectively, as indicated at 8, and which provide extensions of said front and rear walls 2 and 3. The wall portions 6 and 7 extend tangentially from and are integrally formed with the extreme bottom wall portion 9 which is cross sectionally arcuate in the form of a portion of a cylinder, see Fig. 2. The hopper 1 is supported for movements over a field by a pair of axially aligned ground engaging wheels 10. The arcuate bottom wall portion 9 is provided with a plurality of discharge ports 11 that are spaced apart longitudinally of the hopper 1 and are preferably diamond shaped and elongated in the direction of the longitudinal dimension of the hopper. An elongated cross sectionally arcuate gate plate 12, in the form of a portion of a cylinder nestingly engages the arcuate bottom portion of the hopper and is longitudinally slidable with respect thereto. The gate plate 12 is provided with a plurality of longitudinally spaced discharge ports 13 of like size and shape as the hopper bottom discharge ports 11. The ports 13 are spaced apart a distance equal to the spacing between the discharge ports 11, and are movable into and out of registration therewith upon longitudinal sliding movements of the gate plate 12. Machines of the type above disclosed are fully disclosed in my prior patents above identified. Hence, for the sake of brevity, further detailed showing and description thereof is omitted.

The hopper bottom ports 11 and gate plate ports 13 cooperate to define variable area discharge passages 14, said passages 14 being equal to the area of either the hopper bottom discharge ports or the gate plate discharge ports when the same are in full registration, said passage areas diminishing in size under movement of the gate plate ports 13 in a direction away from full registration with the hopper bottom discharge ports 11. Obviously, as the variable area discharge passages 14 diminish in size, the rate of flow therethrough from the interior of the hopper 1 decreases. It will be noted with reference to Fig. 4, that corresponding ends of the hopper bottom ports 11 cooperate with corresponding opposite ends of the gate plate ports 13 to define opposite ends of the discharge passages 14, said passages retaining a diamond shape throughout the variation in size thereof substantially until the passages 14 are totally closed. It will further be noted that, as the passages 14 vary in length, the diamond shape of the cooperating ports cause the passages to vary in the direction of the arcuate dimensions of the hopper bottom and gate plate, so that the rate of discharge of material from the hopper may be very accurately controlled.

My improved feeding rotor involves a pair of cooperating rotors 15, one of which is shown. The rotors 15 are mounted in the bottom of the hopper 1 in coaxial relation to the cross sectionally arcuate bottom wall 9 and in axially spaced relation with respect to each other. The adjacent inner ends of each feeding rotor 15 are suitably journaled in a central transverse partition within the hopper 1. The outer ends of the feeding rotors 15 are operatively connected to a different one of the supporting wheels 10 to be driven thereby, in a manner disclosed in my prior patents heretofore identified. The journaling of the adjacent inner ends of the feeding rotors is also fully disclosed in my said prior patents. In the preferred embodiment of my invention illustrated, the feeding rotor 15 comprises a cross sectionally square central shaft structure 16, which may be assumed to have its opposite ends adapted to be journalled in the central partition, not shown, and operatively coupled to an adjacent supporting wheel 10, a plurality of axially spaced disc-like feeding elements 17 and a plurality of circumferentially spaced feeding bars 18 that extend longitudinally of the hopper 1 in parallel relationship to the rotor shaft 16 through suitable apertures in the several disc-like elements 17. The elements 17 are provided with central openings 19 substantially identical in size and shape to the cross section of the shaft 16, said shaft 16 being received within the central openings 19, and the disc-like elements 17 welded or otherwise rigidly anchored thereto. The elements 17 are also welded or otherwise rigidly anchored to the several feeding bars 18 whereby to provide a rotor structure having extreme rigidity and strength.

It will be noted, with reference to Figs. 3 and 4, that the disc-like feeding elements 17 are so disposed longitudinally of the rotor shaft 16, that each element 17 is normal to the rotor shaft and overlies a corresponding end of a different one of the hopper bottom discharge ports 11. It will be further noted that the underlying end portions of the hopper bottom discharge ports 11 are those which cooperate with the opposite ends of the gate plate ports 13 to define the variable area discharge passages. In other words, when the discharge passages 14 are at or near their minimum area, each passage will underlie a different one of the disc-like elements 17.

Each of the disc-like feeding elements 17 defines a plurality, as shown 4, of feeding teeth 20, each of said teeth having a leading face 21 and an outer face 22 which intersect to define outer edges 23. With reference to Fig. 2, it will be seen that the leading faces 21 of the teeth 20 diverge rearwardly of the direction of rotation of the feeding rotor 15 toward the central portion of the rotor from a radius of the rotor including the outer edge 23 of each tooth, said radius being shown in Fig. 2 by a broken line X—X, whereby to provide a rake angle. Furthermore, the outer face 22 of each tooth diverges rearwardly with respect to the direction of rotation of the rotor 15 from the circle described by the outer edges 23 of the teeth during rotation of the hopper, to provide a rearwardly expanding clearance between said leading edges 23 and said circle. The disc-like feeding elements 17 are of such maximum diameter that the radius of the circle described by the outer edges 23 of the teeth 20 is only sufficently less than the radius of the inner surface of the hopper bottom 9 to provide a clearance fit between said edges 23 and the inner surface of the hopper bottom 9. This clearance fit is sufficient to prevent the outer edges 23 of the teeth 20 from being caught on the edges of the underlying portions of the hopper bottom ports 11, and is such that the granules of fertilizer, seed or the like cannot become interposed between said edges 23 and the bottom of the hopper adjacent the ports 11 therein. With reference to Figs. 4 and 5, it will be seen that the leading face 21 of each tooth 20 is curved at its inner end portion to tangentially meet the rear end portion of the radially outer face 22 of the preceding tooth 20, as indicated at 24.

The feeding bars 18, which preferably correspond in number to the teeth 20, are preferably made from cross sectionally square stock, and are disposed in radially spaced relation to the central shaft 16 and radially inwardly of the outer faces 22 of the teeth 20. With reference particularly to Fig. 2, it will be seen that each feeding bar 18 is substantially circumferentially central between the leading faces 21 of adjacent teeth 20. Each feeding bar 18 defines a leading face 25 and an outer face 26 which intersect to define a relatively sharp outer edge 27. The leading face 25 diverges forwardly in the direction of rotation of the rotor toward the central portion of the rotor from a radius of the rotor including the outer edge 27, said radius being shown by a broken line Y—Y in Fig. 2. The outer face 26 of each feeding bar 18 diverges rearwardly of the direction of rotation of the rotor from a circle described by the outer edge 27 to provide a rearwardly expanding clearance between each feeding bar and said circle upon rotation of the rotor. This clearance like that defined by the outer surface 22 of each tooth 20 expands rearwardly with respect to the bottom of the hopper when each tooth and feeding bar is disposed between the bottom of the hopper and the central shaft 16.

The leading faces 25 of the feeding bars diverge inwardly and forwardly from their respective radius lines Y—Y, one of which is shown, only sufficiently to feed granular material in a direction generally radially outwardly of the axis of the rotor at a relatively slow rate as each feeding bar 18 moves away from the bottom of the hopper. Of course, as each feeding bar approaches the bottom of the hopper material is fed thereby at a relatively fast rate. The above-mentioned slow rate of feed of the bars 18 diminishes as each bar moves beyond and upwardly away from its position of closest proximity to the discharge passages 14. The feeding bars 18 are effective to assure a uniform feed rate when the hopper bottom discharge openings 11 and the gate plate discharge openings 13 are respectively positioned to define discharge apertures in the relatively large area range. The angles of the leading faces 25 relative to their respective radial lines Y—Y is sufficiently small to prevent excess pressure against the granular material therebetween and the hopper bottom when feeding at a relatively slow rate, such as occurs when the discharge ports are positioned to define relatively small discharge passages 14. The leading faces 21 of the teeth 20 operate to feed granules downwardly toward the passages 14 when said passages are near or at their minimum feeding size and serve to break up lumps of granules of relatively small size but which are sufficiently large to cause the same to become lodged within the discharge passages, whereby to maintain the discharge passages in an open condition. In the event of fracture of granules, the outer edges 23 of the teeth 20 run sufficiently close to the inner surface of the hopper bottom 9 to maintain the underlying portions of said inner surface in a relatively clean condition, and prevent a build-up of material adjacent the minimum sized discharge passages 14. In the event that the granular material occurs in lumps of a size greater than the distance between adjacent feeding disc-like elements 17, the lumps of material gravitate downwardly in the hopper and come to rest upon one or more of the disc-like elements 17, whereupon the teeth 20 force said relatively large lumps against the wall portion 6 of the hopper bottom section 5 and break off portions of the relatively large lumps so that the same come to rest on the uppermost ones of the feeding bars 18. The feeding bars 18 then cooperate with the teeth 20 and the wall portion 6 of the hopper to further reduce the size of the lumps to a point where the material may be easily fed through the discharge passages 14, and with a minimum of breakage of individual granules of said material. The radial distance between the feeding bars 18 and the hopper bottom 9 permits sufficient loose granular material to become interposed between the lumps thereof and the bottom wall 9 of the hopper, so that said loose material acts as a cushion against which the smaller lumps are broken down into individual granules. The disc-like elements 17 are made from relatively thin sheet steel and have an axial thickness less than the dimension of the respective hopper bottom ports 11 taken longitudinally along the hopper 1 and the individual granules of the material being fed tend to roll away from the leading faces 21 of the teeth 20, the rake angle of the leading faces 21 and the clearance angle thereof together with the relative thinness of the elements 17 cause the disc-like elements to pass through the granular material in the bottom of the hopper without packing the same against the inner surface of the hopper bottom, thus causing the disc-like elements to be maintained in a relatively clean condition.

My novel feeding rotor structure has been tested with a wide variety of commercially available granular fertilizer material, as well as various seeds, and has been found to be completely satisfactory for the efficient feeding thereof between the minimum and maximum feeding rates determined by the size of the discharge passages 14, the toothed disc-like elements 17 are particularly effective in maintaining a uniform rate of feed at the lowest rate thereof, thus overcoming a serious problem heretofore encountered.

While I have shown and described a commercial embodiment of my improved spreader construction, it will be understood that the same is capable of modification without departure from the spirit and scope of the invention as defined in the claims.

What I claim is:

1. In a device of the class described, a hopper having a bottom wall in the form of a portion of a cylinder, said bottom wall having a plurality of longitudinally spaced ports in the bottom portion thereof, a valve-acting gate plate in the form of a portion of a cylinder disposed in underlying face to face relationship with the hopper bottom wall and longitudinally slidable with respect thereto, said gate plate having a plurality of ports of spacing identical to said hopper bottom ports and simultaneously movable into and out of registration with cooperating ones of said hopper bottom ports upon sliding movements of said gate plate in opposite directions, and an elongated feeding rotor comprising a rotary shaft mounted in said hopper in coaxial relation to the cross sectionally arcuate bottom wall, a plurality of disc-like feeder elements mounted fast on said shaft in axially spaced relation, said feeder elements each over-lying a different one of said hopper bottom ports and each defining a plurality of circumferentially spaced teeth having leading faces and outer faces intersecting said leading faces to define outer edges moving over their respective hopper bottom ports upon rotation of said rotor, the outer edge of each of said teeth describing on rotation of the feeding rotor a circle having a radius only sufficiently less than that of the inner surface of the hopper bottom wall to produce a clearance fit between said outer edges and the inner surface of the hopper bottom wall, and a plurality of circumferentially spaced elongated feeder bars corresponding in number to the number of teeth and extending axially through said feeder elements in radially spaced parallel relation to said shaft, each of said feeder bars being disposed circumferentially between adjacent ones of said teeth and radially inwardly of the outer faces thereof, each of said feeder bars being provided with a flat leading face and an outer face, said faces intersecting to define a sharp outer edge, said leading face of each feeder bar diverging forwardly in the direction of rotation of the feeding rotor from a radius of the feeding rotor which includes the outer edge of the feeder bar, said outer face of each feeder bar diverging rearwardly of the direction of rotation of said feeding rotor from a circle described by said outer edge of the feeder bar to provide a rearwardly expanding clearance between the feeder bar and the hopper bottom wall upon rotation of said feeding rotor.

2. The structure defined in claim 1 in which the hopper bottom ports and gate plate ports cooperate to define variable area discharge passages which change in size responsive to movement of said gate plate, and in which said disc-like feeder elements each overlie the end portions of their respective hopper bottom ports which cooperate to define an end of each of said variable area passages in a position of the gate plate wherein said discharge passages are of minimum area.

3. The structure defined in claim 1 in which said rotary shaft is cross sectionally polygonal to define longitudinally extending edges equal in number to said feeder bars, each of said rotary shaft edges being disposed circumferentially between an adjacent pair of said feeder bars.

4. The structure defined in claim 3 in which said rotary shaft edges are each disposed circumferentially between a radius of the feeding rotor which includes the leading face of one of said teeth and the next one of said feeder bars preceding said one of the teeth in the direction of rotation of the feeding rotor.

5. In a device of the class described, a hopper having a bottom wall in the form of a portion of a cylinder, said bottom wall having a plurality of longitudinally spaced ports in the bottom portion thereof, a valve-acting gate plate in the form of a portion of a cylinder disposed in underlying face to face relation with the hopper bottom wall and movable with respect thereto, said gate plate having a plurality of longitudinally spaced ports movable into and out of registration with the hopper bottom ports upon movement of said gate plate to define with the hopper bottom ports discharge passages having variable areas, an elongated feeding rotor including a rotary shaft structure mounted in said hopper in coaxial relation to the bottom wall and a plurality of flat disc-like feeder elements mounted fast on said shaft structure in axially spaced relation to each other with the plane of each of said feeder elements being normal to the axis of the shaft structure of said feeding rotor, each of said feeder elements over-lying the portion of a different one of said hopper bottom ports which cooperate with the gate plate ports to define the discharge passages and being of an axial thickness less than the dimension of the respective hopper bottom port taken longitudinally of the hopper, each of said feeder elements including a plurality of circumferentially spaced teeth having leading faces and outer faces which intersect to define outer edges, said outer edges of the teeth of each feeder element describing during the rotation of the feeding rotor a circle having a radius only sufficiently less than that of the inner surface of the hopper bottom to provide a clearance fit between said outer edges and the inner surface of the hopper bottom wall, and a plurality of circumferentially spaced elongated feeder bars corresponding in number to the number of teeth and extending axially through the feeder elements in radially spaced parallel relation to the shaft, each of said feeder bars being disposed circumferentially between adjacent ones of the teeth and radially inwardly of the outer faces thereof, each of the feeder bars being provided with a generally flat leading face and an outer face, said faces intersecting to define a sharp outer edge, said leading face of each feeder bar diverging forwardly in the direction of rotation of the feeding rotor from a radius of the feeding rotor which includes the outer edge of the feeder bar, said outer face of each feeder bar diverging rearwardly of the direction of rotation of said feeding rotor from a circle described by said outer edge of the feeder bar to provide a rearwardly expanding clearance between the feeder bar and the hopper bottom wall upon rotation of said feeding rotor.

References Cited in the file of this patent

UNITED STATES PATENTS

| | | |
|---|---|---|
| 235,738 | Burner | Dec. 21, 1880 |
| 254,957 | Grow | Mar. 14, 1882 |
| 627,499 | Goldbacher et al. | June 27, 1899 |
| 1,650,808 | Van Brunt | Nov. 29, 1927 |
| 2,193,253 | Masters | Mar. 14, 1940 |
| 2,526,609 | Masters | Oct. 17, 1950 |
| 2,762,535 | Kriegbaum | Sept. 11, 1956 |